US007603463B2

(12) United States Patent
Argo

(10) Patent No.: US 7,603,463 B2
(45) Date of Patent: Oct. 13, 2009

(54) METHOD AND APPARATUS FOR ALLOCATING PROCESSING CAPACITY OF SYSTEM PROCESSING UNITS IN AN EXTRANET GATEWAY

(75) Inventor: Hansel Dennis Argo, Townsend, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 825 days.

(21) Appl. No.: 10/736,062

(22) Filed: Dec. 12, 2003

(65) Prior Publication Data

US 2005/0144282 A1 Jun. 30, 2005

(51) Int. Cl.
*G06F 15/173* (2006.01)
(52) U.S. Cl. .................... 709/225; 709/223; 709/224; 709/226
(58) Field of Classification Search .......... 709/223–226
See application file for complete search history.

(56) References Cited

U.S. PATENT DOCUMENTS

| 6,092,113 | A  | * | 7/2000 | Maeshima et al. ......... 709/230 |
|-----------|----|---|---------|-----------------------------------|
| 6,684,274 | B1 | * | 1/2004 | Chong, Jr. ................... 710/56 |
| 6,690,671 | B1 | * | 2/2004 | Anbiah et al. ......... 370/395.43 |
| 6,772,226 | B1 | * | 8/2004 | Bommareddy et al. ...... 709/245 |
| 6,778,496 | B1 | * | 8/2004 | Meempat et al. ........... 370/230 |
| 6,778,498 | B2 | * | 8/2004 | McDysan ................... 370/231 |
| 6,820,123 | B1 | * | 11/2004 | Gourlay ..................... 709/226 |
| 6,952,728 | B1 | * | 10/2005 | Alles et al. ................. 709/224 |
| 6,973,057 | B1 | * | 12/2005 | Forslow ..................... 370/328 |
| 7,003,307 | B1 | * | 2/2006 | Kupsh et al. ............... 455/466 |
| 7,050,961 | B1 | * | 5/2006 | Lee et al. ...................... 703/22 |
| 7,061,921 | B1 | * | 6/2006 | Sheth .................... 370/395.52 |
| 7,082,530 | B1 | * | 7/2006 | Diamant .................... 713/153 |
| 7,111,072 | B1 | * | 9/2006 | Matthews et al. ........... 709/238 |
| 7,116,679 | B1 | * | 10/2006 | Ghahremani ................ 370/463 |
| 7,117,530 | B1 | * | 10/2006 | Lin ............................. 726/15 |
| 2002/0097736 | A1 | * | 7/2002 | Cohen ........................ 370/419 |

(Continued)

OTHER PUBLICATIONS

Chen et al. Flexible control of a parallelism in a multiprocessor PC router, 2001, http://citeseer.ist.psu.edu/cache/papers/cs/22000/http:zSzzSzwww.pdos.lcs.mit.eduzSzpaperszSzclick:usenix01zSzusenix01.pdf/chen01flexible.pdf.*

(Continued)

*Primary Examiner*—Kenny S Lin
*Assistant Examiner*—Hieu T Hoang
(74) *Attorney, Agent, or Firm*—Anderson Gorecki & Manaras LLP

(57) ABSTRACT

The expected processing bandwidth of System Processing Units (SPUs) in an extranet gateway is first assessed, for example by multiplying a CPU processor speed by a conversion factor or determining the type of accelerator, and then adjusting the capacity to take into account other processing requirements on the SPU. Once assessed, a load distribution system assigns tunnels to the SPUs based on their processing capacity. As tunnels are assigned and torn down, the estimated available processing capacities of the SPUs are adjusted to account for the assignment or release of the system processing resources attributable to those VPN services. Tunnel assignment may take into account the ability of a SPU to handle the type of tunnel, the absolute or relative capacity of the SPUs, the type of tunnel being assigned, features of the tunnel such as the presence of compression, and efficiencies of the SPU at handling that tunnel type with selected features.

14 Claims, 3 Drawing Sheets

U.S. PATENT DOCUMENTS

| | | | |
|---|---|---|---|
| 2003/0069973 A1* | 4/2003 | Ganesan et al. | 709/226 |
| 2003/0074473 A1* | 4/2003 | Pham et al. | 709/246 |
| 2003/0088698 A1* | 5/2003 | Singh et al. | 709/239 |
| 2003/0177221 A1* | 9/2003 | Ould-Brahim et al. | 709/223 |
| 2003/0212901 A1* | 11/2003 | Mishra et al. | 713/200 |
| 2004/0068668 A1* | 4/2004 | Lor et al. | 713/201 |
| 2004/0168051 A1* | 8/2004 | Guo et al. | 713/153 |
| 2004/0255028 A1* | 12/2004 | Chu et al. | 709/227 |
| 2005/0044221 A1* | 2/2005 | Venkatanarayan et al. | 709/225 |
| 2005/0237955 A1* | 10/2005 | Shapira et al. | 370/299 |

OTHER PUBLICATIONS

Shneyderman et al. Mobile VPNs for next generation GPRS and UMTS networks, 2000, http://esoumoy.free.fr/telecom/tutorial/3G-VPN.pdf.*

* cited by examiner

METHOD AND APPARATUS FOR ALLOCATING PROCESSING CAPACITY OF SYSTEM PROCESSING UNITS IN AN EXTRANET GATEWAY

BACKGROUND OF THE INVENTION

1. Field of the Invention

The present invention relates to communication networks and, more particularly, to a method and apparatus for allocating processing capacity of system processing units in an extranet gateway.

2. Description of the Related Art

Data communication networks may include various computers, servers, nodes, routers, switches, hubs, proxies, and other devices coupled to and configured to pass data to one another. These devices will be referred to herein as "network elements." Data is communicated through the data communication network by passing protocol data units, such as packets, frames, cells, or segments, between the network elements by utilizing one or more communication links between the devices. A particular packet may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

A Virtual Private Network (VPN) may be formed by securing communications between two or more networks or network elements to form a VPN tunnel, such as by encrypting or encapsulating transmissions between the networks or network elements. Using VPN tunnels enables information to be exchanged securely between geographically dispersed sites without requiring the network in between those sites to be otherwise secure. VPN tunnels thus may be used to secure traffic, for example, across a public network such as the Internet. VPN tunnels may be used in many contexts, however, and securing traffic on the Internet is merely one example of a use for VPN tunnels.

There are currently two commonly utilized methods of establishing VPN tunnels on a network. The first model is described in Internet Engineering Task Force (IETF) Request For Comments (RFC) 2547, the content of which is hereby incorporated herein by reference. RFC 2547 describes a VPN architecture in which MultiProtocol Label Switching (MPLS)—based tunnels are used to forward packets over the network backbone. One or more instances of Border Gateway Protocol (BGP) are used to distribute routes over the backbone for the VPNs provisioned through a particular Provider Edge network element (PE). Routing information for each VPN serviced by a PE is stored in a separate VPN routing and forwarding table (VRF) or a distinguishable area of the PE's common VRF.

A second model for establishing VPN tunnels through a network is based on the concept of a Virtual Router (VR). A virtual router is a software construct in a physical router that has all the attributes of a physical router, but which shares processor time, switch plane resources, and other physical resources of the physical router. Because the virtual router is logically separate from other virtual routers, it has its own routing space, its own policy information, and is able to be provisioned much the same as any other router on the network.

A given VPN site may connect to multiple VPN tunnels through the external network. For example, a VPN site may wish to establish tunnels to branch offices and may wish to establish client tunnels with individuals or other networks to allow employees, suppliers, and/or customers to access resources on the network associated with the VPN site. In this instance, the VPN site may participate simultaneously on hundreds or thousands of branch office and client VPN tunnels. One or more network elements, such as extranet gateways, may interface these VPN tunnels to the VPN site.

As networks have increased in size and sophistication, the number of tunnels to be supported to a given VPN site has increased dramatically, which places a large burden on the CPU configured to implement the VPN tunnels on the extranet gateway. For example, a given extranet gateway may be required to handle hundreds or thousands of VPN tunnels simultaneously. In a VR-based VPN environment, CPU resources may be required to enable the extranet gateway to function as a virtual router assigned to that VPN. In a MPLS-based VPN, CPU resources may be required to enable the extranet gateway to perform encapsulation and de-encapsulation of VPN traffic into MPLS packets. Additionally, traffic on VPN tunnels is routinely encrypted to provide an added measure of security to the traffic passing on the tunnels. Since encryption operations require considerable CPU resources, encrypting traffic on a VPN tunnel increases the amount of processing time required to handle the protocol data units on that given tunnel.

One way to enable an extranet gateway to handle larger numbers of VPN tunnels is to provide multiple CPUs in the extranet gateway and to include hardware accelerators, such as encryption accelerators, in the extranet gateway. CPUs and hardware accelerators will be referred to herein as system processing units (SPUs). Generally, in modern large extranet gateway network elements, several system processing units, such as one or more CPUs and one or more encryption accelerators, will be used to handle the load placed on the extranet gateway by the VPN tunnels. While this may provide the extranet gateway with sufficient processing power to handle the number of VPN tunnels required to be provisioned through the extranet gateway, an issue arises as to how to distribute the VPN tunnels to the several system processing units in the extranet gateway.

One way to distribute the load between the several system processing units that has been used in the past is to assign VPN tunnels in a round robin fashion, such that a first of the system processing units is assigned a first tunnel, the next SPU is assigned the next, and so-on. Additionally, attempts have been made to use a modified round-robin approach, for example by assigning twice as many tunnels to the accelerators as to the CPUs. Unfortunately, this proves to be unworkable due to the random nature with which tunnels are brought up and taken down, the blind nature of tunnel assignment, and the different processing capabilities of the different system processing units. Additionally, where one of the SPUs needed to be replaced, possibly with a different type of SPU, the assignment process needed to be reconfigured.

SUMMARY OF THE INVENTION

The present invention overcomes these and other drawbacks by providing a method and apparatus for allocating processing capacity of system processing units in an extranet gateway. According to an embodiment of the invention, when the extranet gateway is started or when it is desired that the extranet gateway should start to provide VPN services on behalf of a VPN site, the expected processing bandwidth of the system processing units to be used to process VPN services is assessed. The expected processing bandwidth may be adjusted, as necessary, to account for other processing requirements that may be required of the system processing unit that may detract from that unit's ability to provide processing resources on behalf of tunnels.

Once the expected processing bandwidth of at least one system processing unit has been assessed, the load distribution system assigns processing capacity of the system processing unit(s) dynamically on an as-needed basis to tunnels to be provisioned through the extranet gateway. As tunnels are assigned and torn down, the estimated available processing capacity of the system processing units is adjusted to account for the assignment or release of the system processing resources attributable to those tunnels.

Tunnels may be assigned to the system processing units by assigning tunnels to the system processing units with the greatest estimated available processing capacity. Upon assigning a tunnel to a system processing unit the estimated available processing capacity of that system processing unit will be decremented, either a standard amount or according to the type of tunnel that has been assigned. Optionally, the efficiencies of the system processing units at handling tunnels of a particular type may be taken into account in connection with assigning tunnels of that particular type. By assigning tunnels based on estimated available processing capacity it is possible to fairly allocate VPN tunnel processing responsibility to the system processing units in the extranet gateway.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
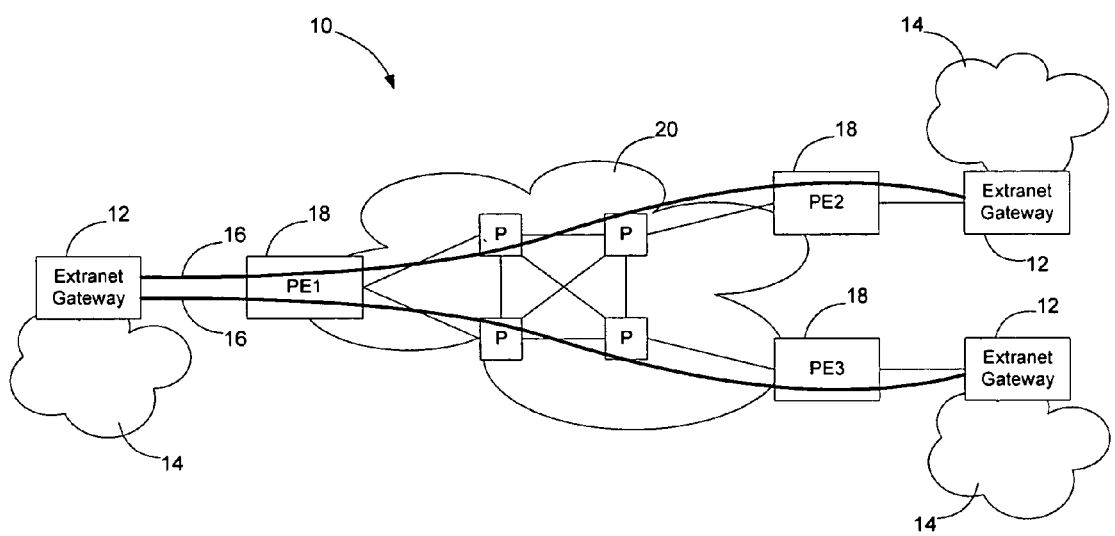
FIG. 1 is a functional block diagram of an example of a network architecture having VPN tunnels provisioned through an extranet gateway according to an embodiment of the invention.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention allocates processing capacity between system processing units in an extranet gateway. According to an embodiment of the invention, when the extranet gateway is started or when it is desired that the extranet gateway should start to provide VPN services on behalf of a VPN site, the expected processing bandwidth of the system processing units to be used to process VPN services is assessed. The expected processing bandwidth may be adjusted, as necessary, to account for other processing requirements that may be required of the system processing unit that may detract from the system processing unit's ability to provide processing resources on behalf of tunnels. In this manner, the capabilities of the system processing units may be initialized. According to one embodiment of the invention, a load distribution subsystem may perform this initial expected processing bandwidth assessment.

Expected processing bandwidth, as that term is used herein, is defined as the amount of VPN tunnel bandwidth a given system processing unit is expected to be able to handle. The expected processing bandwidth may be based on multiple factors, such as the clock speed of the processor used to implement the system processing unit, the instruction set associated with the processor, the bus speed to which the processor is attached, and many other common factors that affect the processing capabilities of a processor. Where the system processing unit is implemented in hardware, or firmware, the particular implementation may affect the expected processing bandwidth as well.

Once the expected processing bandwidth of at least one system processing unit has been assessed, the load distribution subsystem assigns processing capacity of the system processing unit(s) dynamically on an as-needed basis to tunnels to be provisioned through the extranet gateway. As tunnels are assigned and torn down, the estimated available processing capacity of the system processing units is adjusted to account for the assignment or release of the system processing resources attributable to those VPN services. The estimated available processing capacity, as that term is used herein, is the expected processing bandwidth as reduced by any tunnel bandwidth that has been assigned to that system processing unit.

Ascertaining Expected Processing Bandwidth

As set forth above, the load distribution subsystem initially associates an expected processing bandwidth to the system processing units. This may be done in several ways. In a preferred embodiment, the expected processing bandwidth for a CPU is assigned by multiplying the clock speed of the CPU with a conversion factor that has been experimentally or theoretically determined. This converted value is then adjusted as necessary to take secondary factors into account. For an accelerator, according to an embodiment of the invention, the expected processing bandwidth is measured in a test environment and the measured expected processing bandwidth is communicated to the load distribution system.

During the boot process, or if a processor is hot-swapped into an already booted extranet gateway, one of the system values that will be presented to the extranet gateway's operating system will be the clock speed of the attached CPU. This clock speed will be stored as a global variable and will thus be available to the extranet gateway.

The clock speed of the CPU has some correlation to the amount of bandwidth it will be able to handle. To obtain the correlation between the amount of tunnel bandwidth, and hence the number of tunnels, the CPU is able to handle, it is necessary to multiply the clock speed with a conversion factor.

According to one embodiment of the invention, the conversion factor is experimentally determined. Although this may be done in many ways, in a preferred embodiment packets are passed through the CPU and the processing capacity of the CPU is observed. For example, assume that the CPU that has a 2.25 Ghz clock speed. To obtain the conversion factor for this processor, a tunnel may be brought up on the CPU and traffic passed over the tunnel through the CPU. If the CPU is to handle IP traffic, for example, then IP packets may be passed over the tunnel. The CPU will perform standard encryption, de-encryption, encapsulation, and de-encapsulation of the IP packets as it would with packets transmitted over a regular tunnel. The total throughput from the CPU establishes the conversion factor for that CPU.

Taking the results of the experiment(s) it is possible to calculate the conversion factor between processor speed and the amount of bandwidth that processor can handle. For example, let S=clock speed of the processor, B=bandwidth passed by the processor, and C=conversion factor for the processor. In this situation, the Bandwidth=conversion factor times clock speed or $B=C \times S$. Accordingly, the conversion factor $C=B/S$ (conversion factor equals processed bandwidth divided by clock speed). In this example, if the clock speed is 2.25 Ghz and the CPU is able to pass 100 Mbps of tunnel traffic, the conversion factor is 100 Mbps/2.25 Ghz which, ignoring units, is 0.044.

The conversion factor essentially represents an efficiency indication as to how efficiently a CPU can handle VPN traffic on a tunnel. Since the efficiency of the CPU should not change between similarly constructed processors operating at different clock speeds, i.e. CPUs of the same family, the same efficiency factor may be expected to apply to different CPUs.

The experiment may be performed using packets of equal size, such as an average sized IP packet, or alternatively a distribution of packet sizes may be passed through the tunnel to obtain traffic pattern dependent conversion factors. In an experiment conducted by applicants, uniformly sized IP packets having a payload length of 512 bytes were used to arrive at a conversion factor of 0.044. The invention is not limited to a conversion factor of this value, however.

Additionally, although in this embodiment the same conversion factor was applied to all the CPUs, individual conversion factors may be ascertained for different standard CPUs or CPU families and stored in a table to be applied on a per-processing unit type/family basis during initialization. For example, individual conversion factors may be determined to account for differences in processor speed, processor type, processor manufacturer, operating system software, kernel type, or to take into account any number of other factors that may affect a CPU's ability to process packets. Accordingly, the invention is not limited to the manner in which the conversion factor is determined.

In practice, a given extranet gateway manufacturer may have several types of system processing units that may be used in its extranet gateways. Optionally, conversion factors for the expected processing capabilities of the CPU may be determined. Where those conversion factors are close to one value, that one value may be used to determine expected processing capabilities of the CPU based only on processor speed. Where those conversion factors vary substantially it may be advantageous to use two or more conversion factors and to differentiate the CPUs to use the different conversion factors based on speed and/or other factors.

As noted above, the expected processing capability of the SPUs other than the CPUs may be determined experimentally or in another standard manner, such as from the specifications provided by the manufacturer of the accelerator.

Once the initial expected available bandwidth on a given system processing unit is determined, it may be necessary or desirable to adjust that expected available bandwidth to account for other factors, such as whether the system processing unit will be responsible for significant other tasks in the extranet gateway. For example, one of the CPUs may be responsible for servicing interrupts and performing other functions besides VPN tunnel processing. Similarly, one of the CPUs may be assigned to engage in protocol exchanges to set up the tunnels on behalf of the extranet gateway, for example by engaging in Internet Security Association and Key Management Protocol (ISAKMP) exchanges with other extranet gateways. In this circumstance, the CPU will not be able to devote 100% of its time to VPN tunnel processing and, hence, the expected available bandwidth of that CPU should be reduced to take into account the overhead processing requirements for that system processing unit. Other CPUs not responsible for processing these interrupts will not reduced by this factor. Thus, for example, the system CPU that is also tasked with handling general system functions may be assigned 75% of its available bandwidth to handle VPN tunnel processing. Other adjustments may be made as well and the invention is not limited to a system that makes only this adjustment. Likewise, the invention is not limited only to embodiments that make adjustments for these factors.

Assigning Tunnels to System Processing Units

Once the expected available bandwidth for a given system processing unit has been assigned, tunnels may start to be assigned to that system processing unit. Optionally, the system may initialize all system processing units before assigning tunnels to the system processing units or may initialize system processing units as needed and assign tunnels to the available system processing units that have been initialized.

According to an embodiment of the invention, tunnels are assigned to the system processing units by assigning tunnels to the system processing units with the greatest estimated available processing capacity. Upon assigning a tunnel to a system processing unit the estimated available processing capacity of that system processing unit will be decremented, either by a standard amount or according to the type of tunnel that has been assigned. Optionally, the ability of the SPU to handle tunnels of a given type or the efficiencies of the system processing units at handling tunnels of a particular type may be taken into account in connection with assigning tunnels of that particular type. By assigning tunnels based on estimated available processing capacity it is possible to allocate VPN tunnel processing responsibility to the system processing units in the extranet gateway.

In the following description it will be assumed that all SPUs are capable of handling all tunnel types. Where this is not the case, the SPUs capable of handling the new tunnel would first be determined and then the selection process applied to the subset of remaining SPUs. Optionally, where there is more than one type of tunnel type and a subset of the processors are not capable of handling one type of tunnel, they may preferentially obtain tunnel assignments to tunnels of the type which they are capable of handling, so that capacity may be reserved on the other processors. For example, assume that the CPU is able to handle all tunnels and that the accelerator is not capable of handling compressed tunnels. Optionally, non-compressed tunnels may preferentially be assigned to the accelerators to reserve capacity on the CPU to allow it to handle future anticipated compressed tunnels.

The system processing unit with the greatest estimated available processing capacity may be the system processing unit with the absolute largest estimated available processing capacity, or the system processing unit with the largest relative available processing capacity. The term "absolute available processing capacity" refers to a measurement of the total capacity of the system processing unit, and the term "relative available processing capacity" refers to a measurement of the current capacity of the system processing unit relative to the total capacity of that system processing unit.

For example, assume that there are two system processing units, one having an expected processing bandwidth of 100 Mbps with committed resources totaling 35 Mbps, and the other system processing unit having an expected processing bandwidth of 50 Mbps with committed resources totaling 10 Mbps. The absolute capacity of the first system processing unit is 100 Mbps−35 Mbps=65 Mbps and the relative capacity of the first system processing unit is 100%−(35/100) *100%=65%. The absolute capacity of the second system processing unit is 50 Mbps−10 Mbps=40 Mbps, while the relative capacity of the second system processing unit is 100%−(10/50)*100%=80%. If tunnels are assigned by looking at absolute processing capabilities, then the first system processing unit should be assigned the tunnel since it has 65 Mbps of processing capacity available whereas the second system processing unit has only 40 Mbps of available processing capacity. If tunnels are assigned by looking at the relative processing capabilities, then the second system processing unit should be assigned the tunnel since 80% of its available capacity is currently unused whereas the first system processing unit has only 65% of its available capacity unused. Other ways of determining how to allocate tunnels to available system processing units may be used as well and the invention is not limited to using absolute or relative largest capacity to assign tunnels to the system processing units.

In this embodiment, the system processing unit with the highest available bandwidth is assigned the tunnel. Once the tunnel has been assigned, the system processing unit that was assigned the tunnel reduces its available bandwidth. Therefore, its available bandwidth will be lower for the next tunnel to be assigned and it is less likely to be assigned the next tunnel. Although in the mentioned embodiment, the system processing unit with the highest available bandwidth was selected, other methods of selection may be used as well, such as by comparing the type of tunnel to be brought up (e.g. compressed vs. not compressed) and attempting to place tunnels where they may be handled most efficiently. Additionally, other factors may be taken into account as well, such as the ownership of the tunnel, the VPN ID associated with the tunnel, etc. to try to have tunnels associated with the same customer or same VPN ID to be handled either by different system processing units for redundancy purposes, or to have them handled by the same system processing unit for consistency and efficiency purposes. Many factors may be considered and the invention is not limited to using only these several explained factors in determining where to place the VPN tunnel.

A load distribution subsystem may thus be used to allocate VPN tunnels, such as IPSEC sessions/tunnels, to system processing units, such as CPUs and/or hardware accelerators, on a extranet gateway. The load distribution may be performed when the tunnel is first brought up, when it is re-keyed (new encryption keys are exchanged) or dynamically to re-balance the load between the processors. Rebalancing may be advantageous where a particular system processing unit fails, the tunnels are reestablished on other system processing units, and then the failed system processing unit is either replaced or restarted. In this instant new tunnels may be assigned preferentially to this new system processing unit since it may be expected to have a relatively high availability or, optionally, one or more of the existing tunnels may be moved to the new system processing unit.

For example, the extranet gateway may be configured such that tunnels will be assigned to system processing units even where the system processing units do not have an absolute positive capacity, and hence are all over-provisioned. In the event when a new system processing unit is brought up on the extranet gateway, a redistribution or re-key sequence may be initiated to spread some of the tunnels from the over-provisioned system processing units to the under-utilized new system processing unit to increase the ability of the extranet gateway to handle tunnel traffic.

The extranet gateway may not know, initially, the volume of traffic that will be handled by a given tunnel when the tunnel is first brought up. Accordingly, in one embodiment, the load distribution subsystem will make an assumption that each tunnel will use a maximum bit rate. That is, a tunnel is assumed to use from 0 bits per second up to this maximum bandwidth. The maximum bit rate associated with a tunnel may be a fixed quantity and may be the same for all tunnels, may depend on the type of tunnel, may depend on a service level agreement or other rate information associated with the tunnel or type of tunnel, whether the tunnel is to be compressed or uncompressed, whether encryption will be used to secure traffic on the tunnel, and numerous other factors.

However the maximum bandwidth is selected, the load distribution subsystem will assume initially that the system processing unit will need to be able to handle traffic on the tunnel at up to the maximum rate, and hence must have sufficient available processing capacity to handle the maximum amount of traffic. While this assumption may be incorrect, and the tunnel may not use that much processing capacity, according to an embodiment of the invention, this assumption is used in connection with determining where to place the tunnel, i.e., which system processing unit should be tasked with handling traffic for that tunnel. The maximum traffic value, in this instance, is a maximum committed value. The extranet gateway may provide bandwidth in excess of this maximum where there is sufficient capacity, i.e., where current traffic conditions enable the excess traffic to be handled by the extranet gateway. In another embodiment the extranet gateway may allocate tunnels even where the system processor units do not have sufficient capacity, i.e., the expected available capacity of the system processor unit may be allowed to be a negative number. The invention is not limited to this particular implementation or the other particular implementations disclosed herein.

Although in one embodiment the actual load on the tunnels is not monitored, optionally the average traffic on the various tunnels may be monitored and tunnels exchanged between the system processing units to balance average traffic between the various system processing units.

The VPN tunnel encompasses encryption and de-encryption operations where encryption has been chosen to protect traffic on the tunnel. Encryption on a tunnel may be performed using an appropriate encryption protocol such as (DES) Data Encryption Standard, AES (Advanced Encryption Standard) or 3 DES (Triple DES=Triple Data Encryption Standard), and other forms of encryption. The invention is not limited to tunnels that perform these particular functions or that operate using one of these protocols, as these protocols have been identified merely as examples of encryption protocols that may be used in connection with an embodiment of the invention.

In an embodiment where a tunnel is assigned to the system processing unit with the highest absolute or relative available processing capacity, the load distribution subsystem assigns tunnels to a given system processing unit until its available bandwidth has been reduced to the point where it is below that of another system processing unit. For example, assume a extranet gateway has two accelerators and one CPU, and that the accelerators have more capacity than the CPU. Tunnels will be assigned to the accelerator with greater available capacity until the available capacity is reduced to be on par with or below the available capacity of the other accelerator. At this point, tunnels would be assigned to each of the accelerators in turn until the available capacity for each of the accelerators is the same as or lower than that of the CPU. At this point, tunnels would be distributed equally to all of the system processing units in the extranet gateway.

The load distribution subsystem may take multiple factors into account when determining where to place the tunnel. For example, the type of tunnel may be differentiated based on the type of encryption used to form the tunnel. Similarly, the type of tunnel based on expected bandwidth may be used to differentiate the tunnels and may be taken into account when assigning the tunnels. For example, it may be expected that a branch office tunnel may require more bandwidth on average than a standard client tunnel. Thus, the expected traffic volume or required maximum bandwidth may be taken into account when assigning the tunnels. Optionally, one or more of these factors may be ignored by the load distribution subsystems as well depending on the implementation.

Assigning a tunnel to one of the system processing units may cause the available bandwidth on that SPU to be reduced as well as causing the available bandwidth on another SPU to be reduced. For example, an extranet gateway may be configured such that encryption is offloaded to an accelerator, while other operations such as encapsulation associated with tunnel processing are handled by one of the CPUs. In this event, since bringing a tunnel up on one of the accelerators will cause an increased load on one of the CPUs, the available bandwidth associated with the affected CPU will be reduced as well. The amount of bandwidth reduction to each of the SPUs in this example need not be the same and will generally depend on the respective processing requirements associated with the tunnel. For example, the estimated available processing capacity for the accelerator may be reduced by 1 Mbps while the estimated available processing capacity for the CPU may be reduced by 500 Kbps.

Other factors may be taken into consideration when determining how much to reduce the available bandwidth of a SPU when a tunnel is assigned to that SPU. For example, different SPUs may handle compression differently and, accordingly, the amount of reduction to the estimated available processing capacity may depend on whether the intended tunnel will be a compressed tunnel. For example, a given SPU may allocate 800 Kbps to a compressed tunnel and 1 Mbps to an uncompressed tunnel. Another SPU may allocate 1.1 Mbps to a compressed tunnel and 1 Mbps to an uncompressed tunnel. This factor thus allows the load distribution subsystem to attempt to compensate for the performance improvement or penalty that is realized when the tunnel is compressed or when another such factor is present.

In the above description, several examples with specific values have been given to illustrate one way the load distribution subsystem may use actual values to assign tunnels to system processing units and to subsequently decrement the available bandwidth available to handle tunnels on that processor. The invention is not limited to an embodiment using these numbers but rather extends to any manner of allocating bandwidth and decrementing bandwidth as described in general terms herein.

Occasionally, a tunnel will be taken down due to a failure on the tunnel or a determination by one or more of the participants that the tunnel is no longer necessary. Once the tunnel has been taken down or once it is determined that the tunnel will be taken down, the bandwidth assigned to that tunnel by the load distribution subsystem may be added back to the system processing unit so that it may be reassigned when another tunnel is to be brought back up.

Similarly, occasionally, a tunnel will need to be re-keyed. Re-keying typically involves the exchange of new encryption keys so that the encryption session may take place using the new keys. Typically, re-keying takes place by bringing up a new tunnel before the original tunnel is brought down, although this detail is not important to the embodiments of the invention. When the tunnel is re-keyed, the new tunnel may be allocated to any of the system processing units depending on the amount of available bandwidth at the time the tunnel is re-keyed. In this way, re-keying of tunnels may effect a redistribution of tunnels between system processing units on the extranet gateway. Re-keying may be performed periodically, according to a predetermined schedule, or upon the occurrence of an event such as the availability of a new SPU. The invention is not limited to when re-keying operations are performed.

FIG. 1 illustrates an example of a communication network 10 including extranet gateways 12 configured to provide VPN services to VPN sites 14. For purposes of illustration, two VPN tunnels 16 are provisioned between extranet sites, although as described above, a given extranet site may interconnect with numerous other VPN sites. The extranet gateways 12 in this example are connected to provider edge network elements 18 configured to interface the gateways to the high bandwidth resources of the network core 20 that interconnects the provider edge network elements. The provider edge network devices may be any type of network element configured to provide the connectivity between the network core and the VPN site, such as a switch or a router. The invention is not limited to any particular implementation of the provider network (18, 20). Although Provider Edge (PE) and Provider core (P) network elements are illustrated in FIG. 1 and are commonly used in connection with describing IETF RFC 2547 VPN implementations, the invention is not limited to this architecture as any other type of VPN architecture (such as a Virtual Router (VR)-based VPN architecture) may be used as well.

Figure 2:
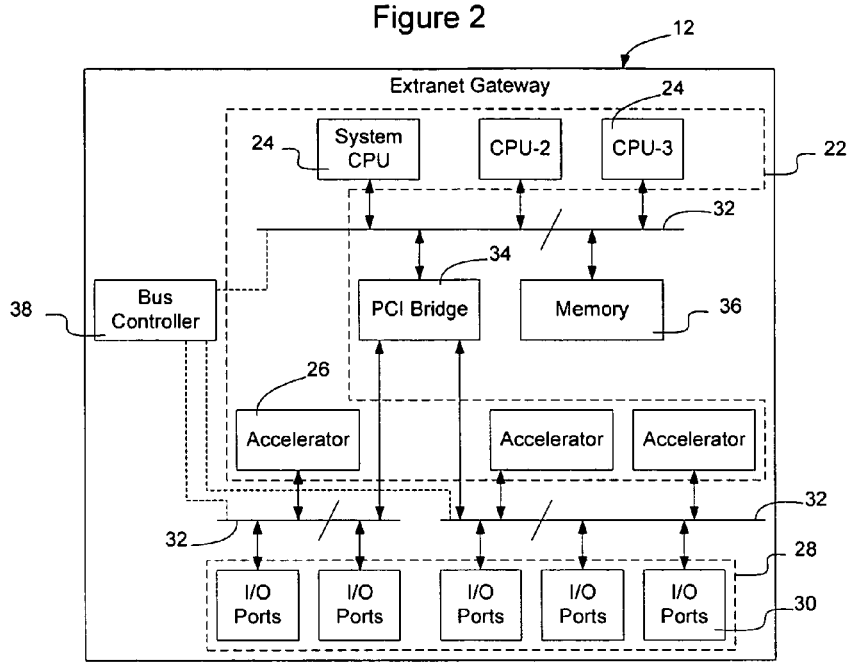
FIG. 2 is a functional block diagram of an extranet gateway according to an embodiment of the invention.

FIG. 2 illustrates an example of an extranet gateway 12 according to an embodiment of the invention. As shown in FIG. 2, the extranet gateway 12 includes a tunnel processing subsystem 22 having several system processing units. In this example, the tunnel processing subsystem has three CPUs 24 and three accelerators 26. The invention is not limited to this particular example as any number of CPUs and accelerators may be used. Additionally, while the system processing units in this example include both CPUs and accelerators, the invention is not limited to this embodiment as only accelerators, only CPUs, accelerators and CPUs, or additional other processing components may be used as well. Other system processing units may be used as well, such as an IP accelerator, and the invention is not limited to only the illustrated types of system processing units. Accordingly, FIG. 2 is to be considered as illustrative of one possible implementation but not limiting of the invention.

As shown in FIG. 2, the extranet gateway may also include an input subsystem 28 having input/output ports 30. The input subsystem 28 and the tunnel processing subsystem 22 may be interconnected by a bus architecture 32 in a conventional manner or other interconnection mechanism such as a switch fabric. The bus architecture 32 may include one or more PCI busses, such as one or more 33 Mhz/32bit busses, a 66 Mhz/32bit busses, a 66 Mhz/64bit busses, 133 Mhz/64bit buses, or any other types of busses. Where more than one bus is used, the busses may be interconnected by a bridge 34. Optionally, the bus characteristics may be taken into account when determining the available bandwidth of the system processing units, although the invention is not limited to an embodiment that considers the bus characteristics.

The extranet gateway may also include other functional components, such as a system memory 36, a bus controller 38 and optionally a dedicated system CPU. The system CPU may be a separate CPU dedicated to handling operations of the extranet gateway or, more likely, will participate in handling tunnel traffic as well as general extranet gateway operations. In this event, the system CPU will be considered a system processing unit and thus may be considered to be as a part of the tunnel processing subsystem 22. Additionally, general extranet gateway processing requirements may be shared across system processing units implemented as CPUs or as other types of system processing units capable of handling such requirements. The invention is not limited to any particular way of configuring the extranet gateway to handle general system functions.

The load distribution subsystem may be implemented in computer software and hosted by one of the CPUs. Alternatively, a dedicated processing system such as a dedicated system processing unit may be utilized to implement the load distribution subsystem. The invention is not limited to being implemented in any particular location in the extranet gateway. Similarly, the load distribution subsystem may be implemented externally to the extranet gateway and load distribution information may be communicated to the extranet gateway from the external load distribution subsystem, for example via a management or dedicated load management port. Accordingly, the invention encompasses many alternative embodiments of interfacing or including the load distribution subsystem within the extranet gateway.

According to one embodiment of the invention, the CPU that is assigned to engage in protocol exchanges to set up the tunnels on behalf of the extranet gateway, for example by engaging in Internet Security Association and Key Management Protocol (ISAKMP) exchanges with other extranet gateways, may also be tasked with implementing the load distribution subsystem described herein. This enables the same CPU to participate in setting up the tunnel and assigning the tunnel to one of the system processing units.

Figure 3:
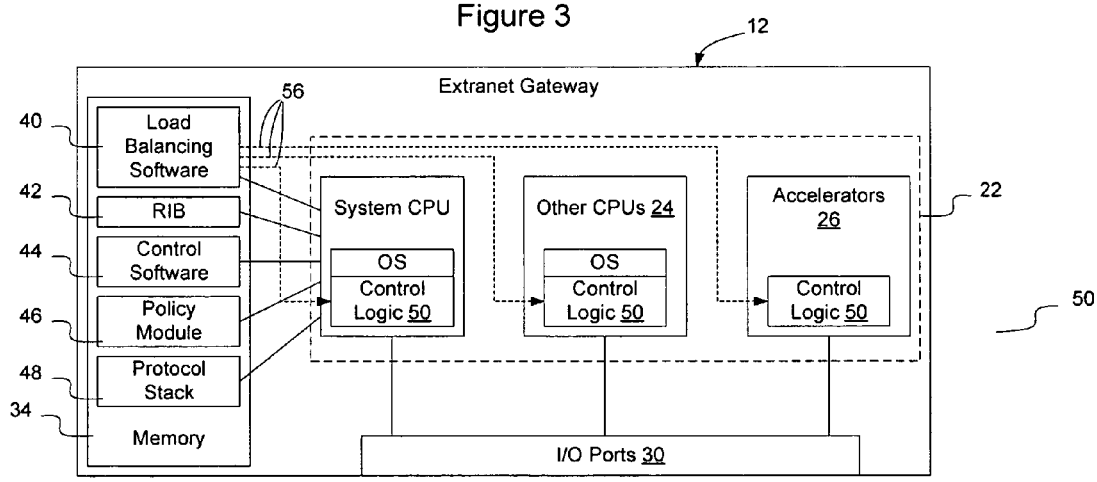
FIG. 3 is a functional block diagram of an extranet gateway according to an embodiment of the invention illustrating a software environment that may be included to perform functions ascribed to one or more embodiments of the invention.

FIG. 3 illustrates an embodiment of the load distribution subsystem implemented as load distribution software 40 on an extranet gateway 12. In this embodiment, the load distribution software 40 is contained in memory 36 that is configured to store data and instructions for access by one or more of the system processing units and/or the system CPU. In this embodiment the memory is illustrated as being connected to the system CPU. As discussed above, the system CPU may be a stand-alone CPU or may be a CPU that is also functioning as a system processing unit. This example is not intended to limit the applicability of the invention to other extranet gateways with other configurations.

The system memory in the embodiment of FIG. 3 also includes several other pieces of software that may be useful to enable the extranet gateway to perform its functions on the network in general or in connection with servicing VPN tunnels. For example, in the embodiment of FIG. 3 the extranet gateway includes a routing information base 42 to enable the extranet gateway to also act as a router. This may be useful where the extranet gateway acts as an edge router for the network associated with the VPN site. The invention is not limited to an extranet gateway that also functions as a router, however.

The system memory may also include control software 44 and a policy module 46 to be controlled by a network administrator and to allow the network administrator or other person or computerized management system to take actions on the extranet gateway and affect the performance of the extranet gateway. For example, it may be desirable to set some of the initial parameters associated with what type of tunnels are to be supported by the extranet gateway, to set parameters associated with how tunnels are to be brought up, and numerous other operational parameters. The invention is not limited to this embodiment, however.

Optionally, the memory 24 may include a protocol stack 48 containing instructions and data configured to assist the extranet gateway in protocol exchanges on the network. Other functional modules may be included as well and the invention is not limited to an extranet gateway having only these or a particular subset of functional modules.

The system processing units and the system CPU (where it is not included as a system processing unit) include control logic 50 to enable them to perform functions described herein to process VPN tunnels and otherwise perform the load distribution functions. The control logic may be the same on all system processing units or may be different on the different system processing units. The fact that the same reference number 50 was used to identify the control logic in the different system processing units is not determinative.

The functions described above and described below in connection with FIG. 4 may be implemented as a set of program instructions such as load balancing software 40 that are stored in a computer readable memory such as memory 36 within the network element 12 and executed on one or more processors 24, 26 within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Figure 4:
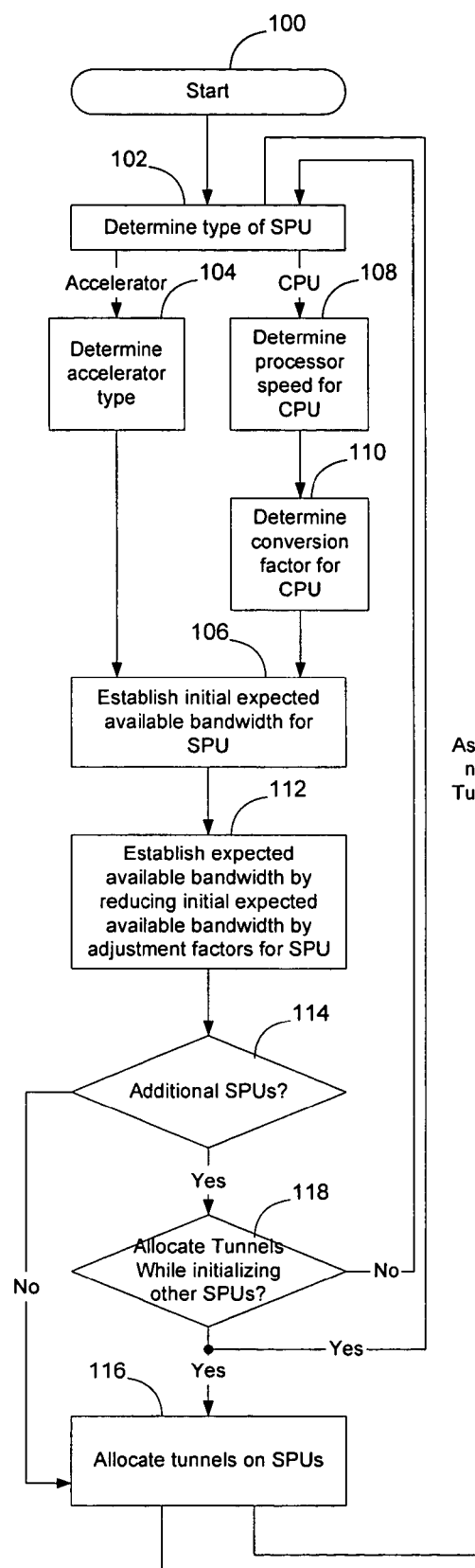
FIG. 4 is a flowchart of a process that may be used to implement an embodiment of the invention.
Figure 4:
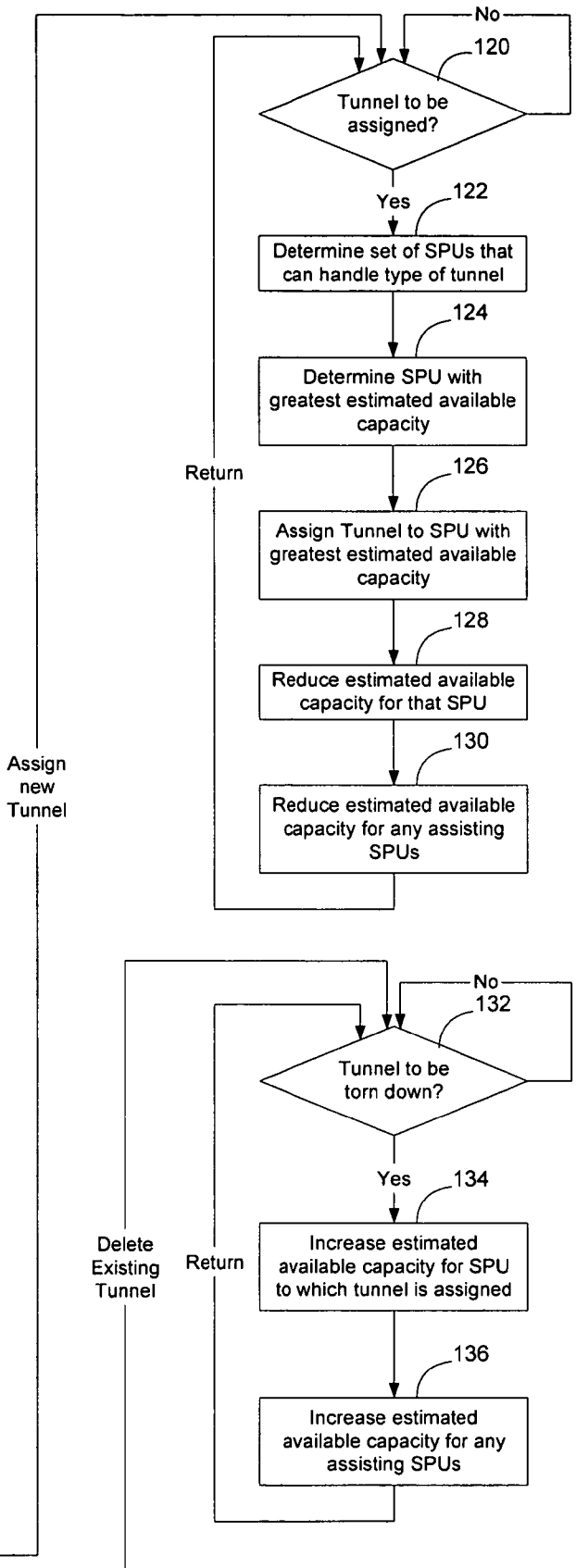

FIG. 4 illustrates a process that may be used to implement an embodiment of the invention. In the following description, the process will be described as being embodied in software. The invention is not limited in this regard as the process may be embodied in software, firmware, hardware, or any combination thereof. Additionally, in the following description the software will be described as being executed centrally on one of the system processing units or a system processor. The invention is also not limited in this regard as the software may be executed by each of the system processor units independent in a distributed fashion to enable the system processing units to independently determine which system processing unit should assume responsibility of the tunnel. All such embodiments are intended to be within the scope of the invention.

As shown in FIG. 4, when the system first starts or one or more system processing units is to be initialized (100), the load distribution software will need to determine or obtain an expected processing bandwidth for the system processing unit(s). Accordingly, the load distribution software will first determine the type of system processor unit to be initialized (102). If the system processing unit to be initialized is an accelerator, the load distribution software will determine the type of accelerator or other identifying information associated with the accelerator and, based on that information, establish an initial expected available bandwidth for the system processing unit (accelerator) (106). If the system processor unit is a CPU, the load distribution software will determine the processor speed for that CPU (108). The load distribution software will then determine a conversion factor for the CPU (110). Where individualized conversion factors are to be used, the load distribution subsystem will obtain an individual the conversion factor for that CPU or type of CPU (110). Optionally, where an object-oriented software program is used to implement the load distribution subsystem, these acts may be performed by retrieving objects containing this data. Establishing the initial expected processing bandwidth (106) may be performed for a CPU, as discussed in greater detail above, by multiplying the conversion factor with the CPU processor speed to obtain an indication about how much tunnel bandwidth the system processing unit is expected to be able to process. For an accelerator, the load distribution software may establish the initial expected bandwidth by reading information from a table, such as by reading experimental or manufacturer-provided information and using this information directly or in connection with other information to compute the initial expected bandwidth.

The initial expected processing bandwidth is then adjusted to take into account other factors that may affect the system processing unit's ability to process traffic (112). For example, where the system processing unit will have significant additional responsibilities the expected processing bandwidth may be reduced.

In this embodiment, the load distribution software is configured to process system processing units serially. Accordingly, the load distribution subsystem will determine if there are additional system processing units to be initialized (114) and, if so, iterate the process for each system processing unit. Alternatively, all system processing units or groups of system processing units may be processed together and the invention is not limited to serial initiation of the system processing units.

Once at least one system processing unit is initialized, the load distribution server may start to allocate tunnels to the system processing units (116). Alternatively, the system may wait until several or all of the SPUs have been initialized. Accordingly, if there are additional SPUs to initialize, the load distribution software will check to see if tunnels are to be allocated while initializing other SPUs (118). If tunnels are not to be assigned during the initialization process, the process will iterate until all or a sufficient number of system processor units have been initialized. If tunnels are to be allocated concurrently with the initialization process, the process will proceed to allocate tunnels (116) and to concurrently iterate initialization of the system processor units.

Allocating tunnels involves assigning tunnels to the system processing units, and keeping track of estimated available processing capacity. Keeping track of estimated available processing capacity may be performed by the load distribution server on behalf of the system processing units or may be included in an object associated with the system processing unit and retrieved/modified as necessary by the load processing subsystem. The invention is not limited to how the information is maintained or accessed by the load distribution subsystem.

As shown in FIG. 4, there are two general events that will impact a system processing unit's estimated available processing capacity. The first is assigning a tunnel to the system processing unit. The second is when a tunnel is torn down and the system processing unit is to delete the existing tunnel and discontinue providing VPN services to that tunnel.

If a tunnel is to be assigned (120), the load distribution subsystem determines the set of system processor units that is capable of handling that type of tunnel (122) and determines the system processing unit with the greatest estimated available processing capacity (124) and assign the tunnel to that system processing unit (126). As discussed above, other selection criteria may be used as well and the invention is not limited to an embodiment that selects the system processing unit with the greatest capacity.

However the system processing unit is selected to service the VPN tunnel, the estimated available processing capacity for that SPU will be reduced by the amount of bandwidth associated with the tunnel (128). Additionally, where the assignment will affect any other system processing units, the estimated available processing capacity for those assisting system processing units will be reduced accordingly (130). The software will then return and wait for additional new tunnels to be assigned.

If an existing tunnel is to be torn down (132) the load distribution subsystem will increase the estimated available capacity for the system processing unit to which the tunnel was assigned (134). The load distribution subsystem will also adjust (e.g. increase) the estimated available capacity for any assisting system processing units that may be affected when the tunnel is torn down (136).

It should be understood that various changes and modifications of the embodiments shown in the drawings and described in the specification may be made within the spirit and scope of the present invention.

For example, the description set forth above has focused on the implementation of a load balancing system implemented as a control program configured to centrally distribute tunnel allocations to system processing units. In another embodiment, each system processing unit is configured to run a software subroutine to perform tunnel allocation determinations. If each system processing unit is configured with the same set of instructions and same starting conditions, each system processing unit will independently arrive at the same conclusion as to which tunnel should assume responsibility for setting up a new tunnel. In the configuration of the extranet gateway illustrated in FIG. 4 and described above, this embodiment may take the form of a set of software subroutines configured to be implemented in the control logic 50 of the several system processing units. This alternative embodiment is illustrated in FIG. 3 by the dashed arrows 56. Communication of the allocation and software objects may optionally take place over the bus.

Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of allocating processing capacity of system processing units in an extranet gateway, the method comprising the steps of:

establishing a first initial expected available processing bandwidth of a first of the system processing units, the first expected available processing bandwidth representing a first amount of VPN tunnel bandwidth which the first of the system processing units is expected to be able to handle;

establishing a second initial expected available processing bandwidth of a second of the system processing units, the second expected available processing bandwidth representing a second amount of VPN tunnel bandwidth the second of the system processing units is expected to be able to handle; and assigning a Virtual Private Network (VPN) tunnel to one of the first and second system processing units for processing according to estimated current available bandwidths of the first and second system processing units, the estimated current available bandwidths being estimated by assessing the initial expected available bandwidths for each system processing unit and decrementing the initial expected available bandwidth of each system processing unit by other processing requirements assigned to that respective system processing unit;

wherein the step of assigning the VPN tunnel to one of the first and second system processing units looks to assign the VPN tunnel to the system processing unit with the highest estimated current available bandwidth, the highest current available bandwidth being based on an absolute bandwidth capacity basis, the absolute bandwidth being calculated by determining which system processing unit has a largest amount of estimated current available bandwidth;

wherein the first initial expected available bandwidth is established by determining whether the first system processing unit is an accelerator or a central processing unit (CPU); and wherein if the first system processing unit is a CPU, the step of establishing the first initial expected available bandwidth comprises determining a type of CPU and CPU speed, obtaining a first conversion factor for the type of CPU, and multiplying the conversion factor with the CPU speed.

2. The method of claim 1, wherein if the first system processing unit is an accelerator, the step of establishing the first initial expected available bandwidth comprises determining a type of accelerator and obtaining expected available bandwidth information for that type of accelerator from an initial expected bandwidth table.

3. The method of claim 1, wherein the first conversion factor is based on an amount of bandwidth passable by that processor type per unit CPU speed.

4. The method of claim 1, wherein the other processing requirements of a system processing unit comprise:
   overhead processing requirements assigned to that system processing unit; and
   processing requirements associated with other VPN tunnels already assigned to that system processing unit.

5. The method of claim 4, wherein the processing requirements associated with other VPN tunnels assigned to that system processing unit comprise encryption and de-encryption processing requirements for the other VPN tunnels.

6. The method of claim 4, wherein the other processing requirements of a system processing unit further comprise processing requirements associated with other VPN tunnels assigned to other system processing units.

7. The method of claim 4, wherein the actual load on the other VPN tunnels assigned to the system processing unit is not monitored or used in connection with estimating the current available bandwidth of the system processing unit.

8. A method of allocating processing capacity of system processing units in an extranet gateway, the method comprising the steps of:
   establishing a first initial expected available processing bandwidth of a first of the system processing units, the first expected available processing bandwidth representing a first amount of VPN tunnel bandwidth which the first of the system processing units is expected to be able to handle;
   establishing a second initial expected available processing bandwidth of a second of the system processing units, the second expected available processing bandwidth representing a second amount of VPN tunnel bandwidth the second of the system processing units is expected to be able to handle; and
   assigning a Virtual Private Network (VPN) tunnel to one of the first and second system processing units for processing by assessing current available bandwidths of the first and second system processing units, the current available bandwidths being determined by assessing the initial expected available bandwidth for that system processing unit as decremented by other processing requirements for that system processing unit;

wherein the step of assigning the VPN tunnel to one of the first and second system processing units looks to assign the VPN tunnel to the system processing unit with the highest estimated current available bandwidth, the highest current available bandwidth being based on a relative bandwidth capacity basis, the relative bandwidth being calculated by determining which system processing unit has a highest percentage of available capacity;

wherein the first initial expected available bandwidth is established by determining whether the first system processing unit is an accelerator or a central processing unit (CPU); and wherein if the first system processing unit is a CPU, the step of establishing the first initial expected available bandwidth comprises determining a type of CPU and CPU speed, obtaining a first conversion factor for the type of CPU, and multiplying the conversion factor with the CPU speed.

9. The method of claim 8, wherein if the first system processing unit is an accelerator, the step of establishing the first initial expected available bandwidth comprises determining a type of accelerator and obtaining expected available bandwidth information for that type of accelerator from an initial expected bandwidth table.

10. The method of claim 8, wherein the first conversion factor is based on an amount of bandwidth passable by that processor type per unit CPU speed.

11. The method of claim 8, wherein the other processing requirements of a system processing unit comprise:
   overhead processing requirements assigned to that system processing unit; and
   processing requirements associated with other VPN tunnels already assigned to that system processing unit.

12. The method of claim 11, wherein the processing requirements associated with other VPN tunnels assigned to that system processing unit comprise encryption and de-encryption processing requirements for the other VPN tunnels.

13. The method of claim 11, wherein the other processing requirements of a system processing unit further comprise processing requirements associated with other VPN tunnels assigned to other system processing units.

14. The method of claim 11, wherein the actual load on the other VPN tunnels assigned to the system processing unit is not monitored or used in connection with estimating the current available bandwidth of the system processing unit.

* * * * *